(12) United States Patent
Dudon et al.

(10) Patent No.: US 10,107,111 B2
(45) Date of Patent: Oct. 23, 2018

(54) CORROSION-RESISTANT ABRADABLE COVERING

(71) Applicant: SAFRAN AERO BOOSTERS, Herstal (BE)

(72) Inventors: Laurent Paul Dudon, Viry-Chatillon (FR); Philippe Charles Alain Le Biez, Draveil (FR); Serge Selezneff, Issy les Moulineaux (FR)

(73) Assignee: Safran Aéro Boosters, Herstal (BE)

( * ) Notice: Subject to any disclaimer, the term of this patent is extended or adjusted under 35 U.S.C. 154(b) by 563 days.

(21) Appl. No.: 14/415,810

(22) PCT Filed: Jul. 16, 2013

(86) PCT No.: PCT/FR2013/051712
§ 371 (c)(1),
(2) Date: Jan. 20, 2015

(87) PCT Pub. No.: WO2014/013190
PCT Pub. Date: Jan. 23, 2014

(65) Prior Publication Data
US 2015/0184526 A1    Jul. 2, 2015

(30) Foreign Application Priority Data

Jul. 20, 2012   (FR) ..................................... 12 57032

(51) Int. Cl.
*F01D 11/12* (2006.01)
*F01D 5/26* (2006.01)
(Continued)

(52) U.S. Cl.
CPC ................ *F01D 5/26* (2013.01); *B22F 5/009* (2013.01); *B22F 7/04* (2013.01); *B29C 70/58* (2013.01);
(Continued)

(58) Field of Classification Search
CPC .............................. F01D 11/122; F01D 11/08
See application file for complete search history.

(56) References Cited

U.S. PATENT DOCUMENTS 3,042,365 A * 7/1962 Curtis ................... F01D 11/125
                                                    277/414
5,529,716 A   6/1996 Nomura et al.
(Continued)

FOREIGN PATENT DOCUMENTS

| EP | 0 630 955 | 12/1994 |
| EP | 1 739 145 | 1/2007 |
| WO | 97/13958 | 4/1997 |

OTHER PUBLICATIONS

International Search Report dated Sep. 13, 2013, in PCT/FR13/051712 filed Jul. 16, 2013.
(Continued)

*Primary Examiner* — Richard Edgar
*Assistant Examiner* — Danielle M Christensen
(74) *Attorney, Agent, or Firm* — Oblon, McClelland, Maier & Neustadt, L.L.P.

(57) ABSTRACT

A corrosion-resistant abradable covering to adhesively bond to a wear portion of a structural part, the covering including at least a polyester-based matrix and an aluminum alloy filler that are molded together.

15 Claims, 1 Drawing Sheet

(51) Int. Cl.
*B29C 70/58* (2006.01)
*B22F 7/04* (2006.01)
*B29D 99/00* (2010.01)
*B32B 7/12* (2006.01)
*B32B 15/09* (2006.01)
*B32B 37/12* (2006.01)
*B32B 37/24* (2006.01)
*C08K 3/08* (2006.01)
*F16J 15/16* (2006.01)
*B22F 5/00* (2006.01)
*B29K 67/00* (2006.01)
*B29K 105/00* (2006.01)
*B29K 505/02* (2006.01)

(52) U.S. Cl.
CPC ............ *B29D 99/0053* (2013.01); *B32B 7/12* (2013.01); *B32B 15/09* (2013.01); *B32B 37/12* (2013.01); *B32B 37/24* (2013.01); *C08K 3/08* (2013.01); *F01D 11/122* (2013.01); *F16J 15/16* (2013.01); *B22F 2007/042* (2013.01); *B22F 2998/10* (2013.01); *B29K 2067/00* (2013.01); *B29K 2105/0079* (2013.01); *B29K 2105/251* (2013.01); *B29K 2505/02* (2013.01); *B29K 2995/0087* (2013.01); *B32B 2255/10* (2013.01); *B32B 2305/30* (2013.01); *B32B 2307/50* (2013.01); *B32B 2309/02* (2013.01); *B32B 2581/00* (2013.01); *C08K 2003/0812* (2013.01); *F05D 2240/11* (2013.01); *Y02T 50/672* (2013.01)

(56) References Cited

U.S. PATENT DOCUMENTS

| | | | | |
|---|---|---|---|---|
| 5,795,659 | A * | 8/1998 | Meelu | C23C 10/28 416/241 R |
| 5,975,845 | A | 11/1999 | Ball | |
| 6,830,428 | B2 * | 12/2004 | Le Biez | F01D 5/20 415/173.4 |
| 7,749,342 | B2 * | 7/2010 | Peslerbe | B22F 7/062 148/527 |
| 2002/0017361 | A1 * | 2/2002 | Walker | G01K 15/00 156/242 |
| 2007/0003412 | A1 | 1/2007 | Le Beiz et al. | |
| 2007/0134411 | A1 * | 6/2007 | Cont | B01J 13/02 427/213.34 |
| 2008/0131686 | A1 * | 6/2008 | Strock | C23C 4/02 428/332 |
| 2008/0304975 | A1 * | 12/2008 | Clark | B22F 7/04 416/241 R |
| 2009/0223632 | A1 | 9/2009 | Le Beiz et al. | |
| 2013/0045370 | A1 * | 2/2013 | Aho | B29C 35/0266 428/213 |

OTHER PUBLICATIONS

Wilson, S. et al., "Abradable Coating Development & Testing", NEWAC, XP002693229, Jun. 30, 2010 , (1 page) :URL:http://www.newac.eu/fileadmin/download/workshop_2010/41_Abradable_Coating_Development_Testing.pdf (retrieved on Mar. 5, 2013).

* cited by examiner

CORROSION-RESISTANT ABRADABLE COVERING

BACKGROUND OF THE INVENTION

The present invention relates to the general field of material for forming abradable coverings. A particular application lies in the field of turbine engines where use is made of abradable seals.

Materials having an abradable property are commonly used in numerous applications, and in particular for forming seals. Abradable seals are used in particular in the rotary portions of a turbine engine, such as in the compressors, in order to reduce leaks of air or gas that might affect the efficiency of the engine. A turbine engine compressor comprises a plurality of blades fastened on a shaft that is mounted inside a stationary ring. In operation, the shaft and the blades rotate inside the compressor ring.

In order to guarantee good efficiency for the turbine engine, it is important to reduce leaks of air or gas in the compression sections of the engine to as little as possible by minimizing the clearance that exists firstly between the tips of the blades and the inside surface of the compressor ring, and secondly between the inter-disk shrouds and the outside surface of the diffuser. Because of thermal and centrifugal expansion of compressor blades, the inside surface of the compressor ring is generally covered in a covering of abradable material so as to form a seal between the stationary portions (specifically the inside surface of the ring) and the moving portions (specifically the tips of the blades) of the compressor of a turbine engine. In the event of contact between the stationary and moving portions of the compressor, the seal made of abradable material makes it possible to obtain clearance that is small without that damaging the parts of the rotor that make contact.

The abradable coverings used in turbine engine compressors are generally made from a composition comprising an alloy of aluminum and silicon (Al—Si) and a polymer such as a polyester, the composition being deposited directly on the wear portion of the part by thermal spraying. In that manner, an abradable covering is obtained that is formed by a matrix of Al—Si alloy, i.e. a continuous phase of the alloy in the material, together with a filler of polyester.

Nevertheless, that type of covering is found to be very sensitive to corrosion, in particular when it is exposed to saline environments or to atmospheric pollution. Corrosion is also made considerably worse when the part, as a result of its shape, e.g. annular, includes retention zones that amplify exposure of the abradable covering to corrosion agents. These corrosion phenomena have the effect of reducing the lifetime of the abradable covering.

Solutions that have been used in the past for reducing the corrosion phenomenon on that type of abradable covering are as follows:
  protecting the abradable covering with a varnish or with an anticorrosion paint;
  waterproofing or draining the retention zones; and
  modifying the abradable composition.

Nevertheless, each of those solutions presents drawbacks. Anticorrosion paints or varnishes serve to protect the covering only on its surface and they cease to be effective once they are worn away. They also increase the cost and the time required for fabricating abradable coverings. Draining retention zones requires holes to be made in the part, thereby weakening its mechanical strength and encouraging leaks of air. Waterproofing increases the cost of fabricating the abradable covering (additional material) and makes mounting and removing parts more complex. Finally, the use of a different abradable covering composition, as described in particular in Document U.S. Pat. No. 7,160,352, implies, in aviation, that the covering needs to be qualified, and that constitutes a major constraint.

OBJECT AND SUMMARY OF THE INVENTION

An object of the present invention is thus to provide an abradable covering that is based on aluminum alloy and polyester but that presents very little or no sensitivity to corrosion, and to do so without having recourse to additional means for surface protection, for drainage, or for waterproofing.

To this end, the invention provides an abradable covering for adhesively bonding to a wear portion of a structural part, the covering being characterized in that it comprises at least a polyester-based matrix and an aluminum alloy filler that are molded together.

Thus, by replacing the Al—Si matrix of the prior art abradable covering with a polyester matrix and by also replacing the polyester filler with an aluminum alloy filler, the nature of the components of the covering are left unchanged, while significantly reducing the corrosion phenomena. The prior art abradable covering obtained by thermal spraying of an Al—Si/polyester mixture leads to a material being formed in which the matrix or continuous phase in the material is essentially constituted by Al—Si, which is an electrically conductive alloy that makes the covering very sensitive to galvanic corrosion. In contrast, the abradable covering of the present invention has a polyester matrix, i.e. a matrix that is not electrically conductive, and that protects the metal filler (Al alloy) against corrosion, and in particular galvanic corrosion.

Consequently, the covering of the invention serves to obtain a significant improvement in lifetime, while conserving the abradable function, since the chemical composition remains the same.

In a first aspect of the abradable covering of the invention, the covering contains 25% to 55% polyester, the remainder or balance of the composition of the abradable covering being constituted by an aluminum alloy. According to a characteristic of the invention, the remainder of the composition of the covering is constituted by an aluminum-silicon alloy containing 11% to 13% silicon. The aluminum alloy is preferably a copper-free Al—Si or Al—Mg—Si alloy from the 4000 or 5000 series, that is particularly good at withstanding saline corrosion.

In a second aspect of the covering of the invention, the matrix is constituted by an aromatic polyester of the liquid crystal polymer type that is poorly reactive, inert, and good at withstanding fire.

The invention also provides a structural part including at least one wear portion having an abradable covering of the invention.

In particular, the structural part of the invention may be made of a metal material or of a composite material with an organic matrix. It may correspond in particular to an aero-engine compressor ring or casing including a wear portion on its inside surface with an abradable covering of the invention.

The invention also provides a turboprop including at least one structural part of the invention, and an aircraft including at least one turboprop of the invention.

The invention also provides a method of fabricating an abradable covering comprising molding a composition comprising at least a polyester powder and an aluminum alloy filler, and adhesively bonding the abradable covering on the wear portion of the structural part.

In a first aspect of the method of the invention, the molding is performed by sintering or by hot injection at a temperature lying in the range 180° C. to 400° C.

According to a second aspect of the method of the invention, the composition contains 25% to 55% polyester, the remainder or balance of the composition of the abradable covering being constituted by an aluminum alloy. According to a characteristic of the invention, the remainder of the composition of the covering is constituted by an aluminum-silicon alloy containing 11% to 13% silicon. The aluminum alloy is preferably a copper-free Al—Si or Al—Mg—Si alloy from the 4000 or 5000 series, that is particularly good at withstanding saline corrosion.

In a third aspect of the method of the invention, the abradable track is made as a plurality of abradable covering sectors that are adhesively bonded adjacent to one another on the wear portion of the structural part in order to form the abradable track.

In a fourth aspect of the method of the invention, the abradable covering is adhesively bonded on the wear portion of the structural part, the temperature during adhesive bonding is less than or equal to 180° C.

According to a fifth aspect of the method of the invention, the abradable covering is cooled prior to being adhesively bonded on the wear portion of the structural part.

BRIEF DESCRIPTION OF THE DRAWING

Other characteristics and advantages of the invention appear from the following description of particular embodiments of the invention given as non-limiting examples, and with reference to the accompanying drawing, in which.

DETAILED DESCRIPTION OF AN EMBODIMENT

Figure 1:
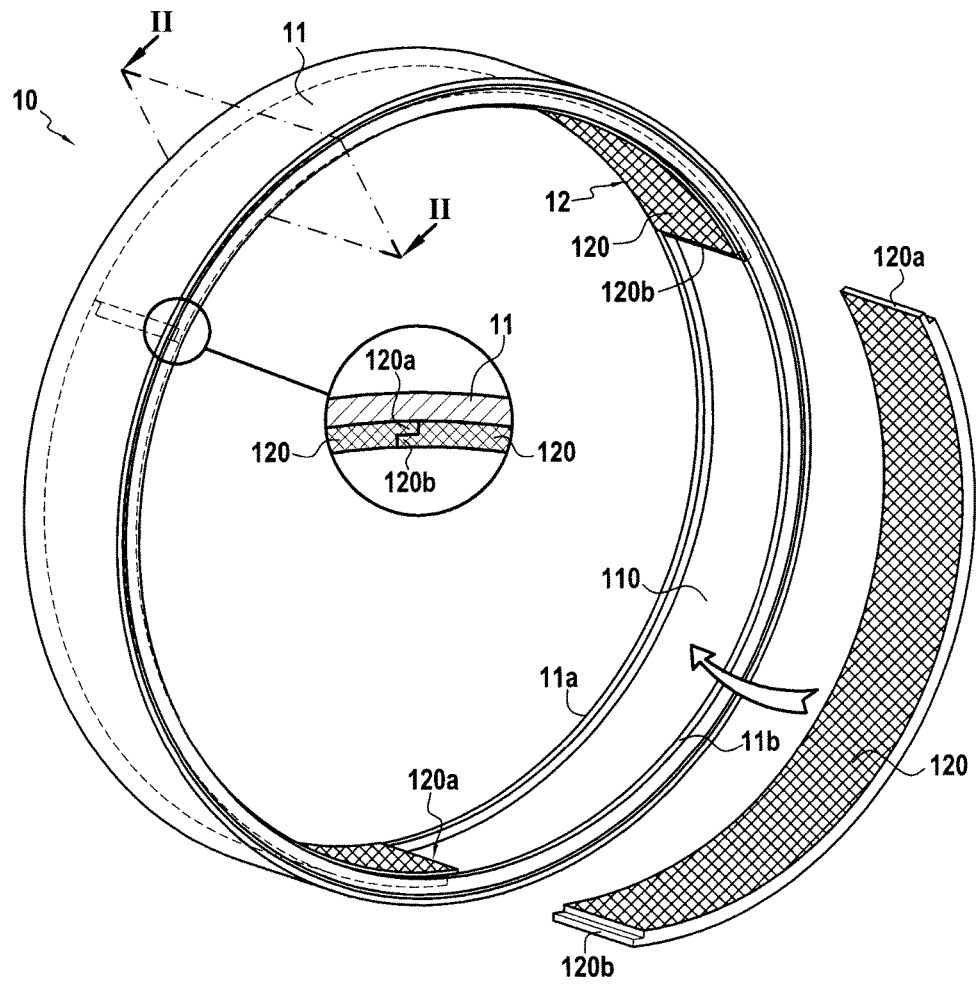
FIG. 1 is a diagrammatic perspective view showing an abradable covering being mounted on a turbine ring in an embodiment of the invention.

The abradable covering of the invention is made from a composition or mixture comprising a polyester powder and an aluminum alloy, in particular an alloy of aluminum and silicon (Al—Si), likewise in the form of a powder of or solid particles. The composition comprises 25% to 55% of polyester, with the remainder or balance being constituted by the aluminum alloy. With an Al—Si alloy, the alloy has 11% to 13% silicon. By way of example, such a composition is available in the form of powders for thermal spraying such as the following powders: Metco 601NS and Durabrade 1605 (60% Al—Si alloy with 12% Si and 40% polyester) sold by the supplier Sulzer-Metco. The polyester used in the composition of the abradable covering of the invention is preferably selected from aromatic polyesters of the liquid crystal polymer class, which are polyesters that have little reactivity, that are inert, and that strongly resist fire, such as for example the polymers sold under the trademarks Ekonol® and Xydar®, or under the reference CGZ-351. The aluminum alloy is preferably a copper-free Al—Si or Al—Mg—Si in the 4000 or 5000 series that is particularly good at withstanding saline corrosion.

In accordance with the invention, the abradable covering of the invention is not formed by thermal spraying as in the prior art, but by molding so as to obtain a matrix of polyester instead of a matrix of Al—Si alloy.

The wear portion of the path onto which the abradable covering is to be adhesively bonded is molded to shape at a temperature lying in the range 180° C. to 400° C. The molding may be performed by sintering or by hot injection.

Sintering presents the advantage of enabling temperature to be controlled accurately during molding, and consequently enabling the abradable nature of the abradable covering to be better adjusted. The sintering/compression time depends on the shape of the mold and on the thickness of the abradable covering to be formed. The sintering pressure is not less than 50 megapascals (MPa).

Hot injection is adjusted mainly as a function of the fluidity of the composition to be injected. The parameters for controlling hot injection are as follows:
 the temperature of injection;
 the pressure of injection; and
 the duration of injection.

These parameters depend on the nature of the material that is to be injected and also on the shape of the molding tooling, and in particular on the number of injection points.

The abradable covering may be molded as a single piece, or else as a plurality of sectors that are assembled together during adhesive bonding. Molding as a single piece requires a specific mold to be prepared having the shape of the entire wear portion of the part, but subsequently facilitates assembly during adhesive bonding, whereas molding in sectors simplifies the design of the mold, but requires accuracy in assembling the sectors together during adhesive bonding.

When molding in sectors, it is possible to optimize the shapes of the connection portion between sectors so as to make them easier to align, such as a shape that is smooth or chamfered. In addition, the connection portions of each sector may be more elaborate in shape, such as for example a shape with crenellations and/or chevrons or an undulating shape, in order to increase the cohesion of mechanical strength and reduce any leakage between sectors.

Once the abradable covering has been molded to the desired shape, it is adhesively bonded onto the wear portion of the structural part. Mounting the covering by adhesive bonding may be performed at ambient temperature, with the structural part and the abradable covering being at the same temperature. This makes it possible to obtain this an abradable covering that is not under any stress on the part, as contrasted to when the covering is deposited on the part by thermal spraying as in the prior art. With thermal spraying, the covering formed in that way is under tension on the part because of the differences between the coefficients of thermal expansion of the covering and of the part or substrate onto which it is sprayed.

Furthermore, by the method of the invention, the covering may even be adhesively bonded on the part while the covering is in compression, with this being done by cooling the molded covering before bonding it onto the part, when the covering presents a coefficient of thermal expansion that is greater than that of the material of the part.

When the bonding is performed with adhesive in the form of a liquid or a film that requires heat treatment, generally at a maximum temperature of 180° C., the molded abradable covering may be put into place on the structural part at ambient temperature. Nevertheless, the element(s) making up the abradable covering is/are preferably cooled prior to being put into place and adhesively bonded, e.g. by spending time in a deep freeze or by using a refrigerating gas such as $CO_2$, in order to make the element(s) contract. Thus, it is easier to put the elements making up the abradable covering into place on the structural part because of the greater clearance between the element(s) of the abradable covering and the structural part. On heating, the element(s) of the abradable covering expand and move correctly into final position on the part for adhesive bonding. Under such circumstances, the abradable covering is in compression on the structural part.

The adhesive bonding is performed using support tooling enabling dynamic pressure points and wetting to be applied so as to position the molded covering or the molded covering sectors accurately in position on the wear portion of the part.

For bonding, an adhesive is used in the form of a liquid or a film capable of operating continuously at a temperature of at least 140° C., e.g. an adhesive of 180° C. class such as the adhesives sold under the references FM 475, FM 34, Meltbond 329, and Redux 322.

After the covering has been bonded onto the part, it may optionally be machined in order to adjust it to match the defined final dimensions.

Figure 2:
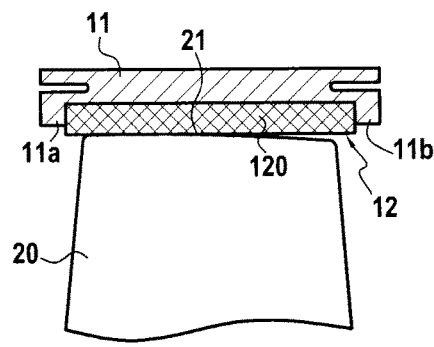
FIG. 2 is a section view of the FIG. 1 ring mounted around a set of rotary blades.

FIG. 1 shows a low pressure compressor ring 10, e.g. for a turbine engine diffuser. As shown in FIG. 2, the ring 10 surrounds a rotary assembly made up of a plurality of blades 20, with the clearance between the inside surface of the ring and the tips 21 of the blades being zero or almost zero.

The ring 10 comprises a structural metal support 11 having on the inside a wear portion 110 defined by two rims 11a and 11b. The abradable covering 12 is adhesively bonded to the wear portion 110. More precisely, in the presently-described example, the abradable covering 12 is made up of a plurality of sectors 120 that are bonded end to end onto the wear portion so as to form an abradable covering that is continuous on the inside of the ring. The ends of each of the sectors 120 are provided with respective connection portions 120a and 120b presenting a stepped shape so as to enable the sectors to be assembled together while being mutually engaged.

Nevertheless, the abradable covering could be molded as a single piece and adhesively bonded directly onto the ring, which is also a single piece, without any need to sectorize the covering or the ring.

In the presently-described example, the support 11 is made of a metal material such as titanium, steel, or aluminum.

The structural part (ring) on which the abradable covering is bonded may also be made of composite material, i.e. a part comprising fiber reinforcement that is densified by a matrix. In particular, it may be made out of an organic matrix composite material, the fiber reinforcement being made from a fiber structure obtained by weaving, assembly, knitting, etc. using fibers such as glass fibers, carbon fibers, or metal filaments. The fiber structure is then densified with a matrix, which may in particular be a thermoplastic or a thermosetting resin.

The present invention is not limited to forming abradable coverings for a compressor ring. It applies to making any type of abradable covering that is to be used in a corrosive environment.

The invention claimed is:

1. An abradable covering for adhesively bonding to a wear portion of a structural part, the covering comprising:
   at least a polyester-based matrix and an aluminum alloy filler that are molded together,
   wherein the molding is performed by sintering or hot injection into a mold,
   wherein the abradable covering contains 25% to 55% polyester, a remainder of the abradable covering composition being constituted by an aluminum alloy having 11% to 13% silicon, and
   wherein the matrix is constituted by an aromatic polyester of liquid crystal polymer type.

2. A covering according to claim 1, wherein the aluminum alloy is of 4000 or 5000 series.

3. A structural part including at least one wear portion having an abradable covering according to claim 1.

4. A part according to claim 3, the part being made of a metal material or of a composite material.

5. A part according to claim 3, the part corresponding to a compressor ring of an aeroengine, the compressor ring including a wear portion on an inside surface thereof.

6. A turboprop comprising at least one structural part according to claim 3.

7. An aircraft comprising at least one turboprop according to claim 6.

8. A covering according to claim 1, wherein the aluminum alloy is free of copper.

9. A method of making an abradable covering on a structural part having a wear portion, the method comprising:
   molding a composition comprising at least a polyester powder and an aluminum alloy filler to form the abradable covering; and
   adhesively bonding the abradable covering on the wear portion of the structural part,
   wherein the molding is performed by sintering or hot injection into a mold,
   wherein the abradable covering contains 25% to 55% polyester, a remainder of the abradable covering composition being constituted by an aluminum alloy having 11% to 13% silicon, and
   wherein the matrix is constituted by an aromatic polyester of liquid crystal polymer type.

10. A method according to claim 9, wherein the molding is performed at a temperature in a range of 180° C. to 400° C.

11. A method according to claim 9, wherein the aluminum alloy is of 4000 or 5000 series.

12. A method according to claim 9, wherein the abradable covering is made as a plurality of abradable covering sectors that are adhesively bonded adjacent to one another on the wear portion of the structural part to form the abradable covering.

13. A method according to claim 9, wherein the abradable covering is adhesively bonded on the wear portion of the structural part at a temperature that is less than or equal to 180° C.

14. A method according to claim 9, wherein the abradable covering is cooled prior to being adhesively bonded on the wear portion of the structural part.

15. A method according to claim 9, wherein the aluminum alloy is free of copper.

* * * * *